H. A. REYNOLDS.
AUTOMOBILE STARTING DEVICE.
APPLICATION FILED NOV. 2, 1917.
1,330,092.
Patented Feb. 10, 1920.
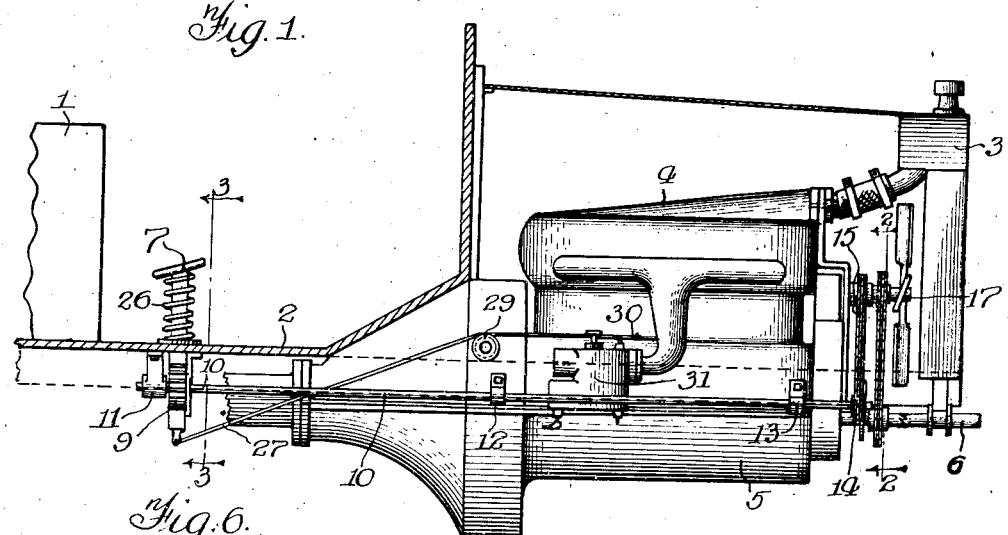
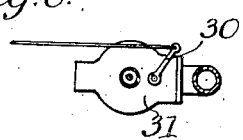
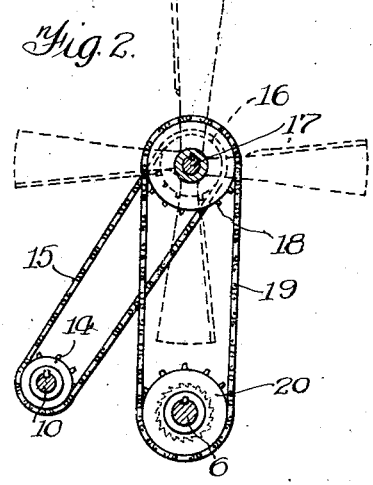
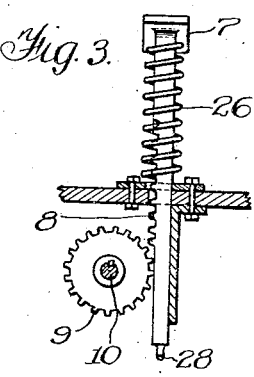
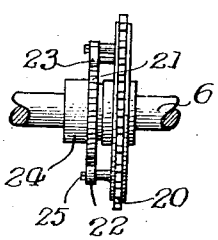
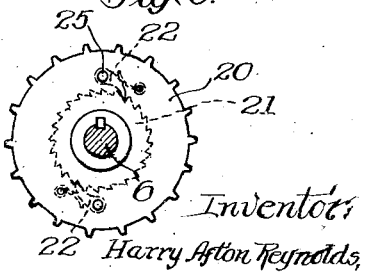
Witnesses:
Inventor:
Harry Afton Reynolds,
By W. E. Williams
Atty.

UNITED STATES PATENT OFFICE.

HARRY AFTON REYNOLDS, OF CHICAGO, ILLINOIS.

AUTOMOBILE STARTING DEVICE.

1,330,092.  Specification of Letters Patent.  Patented Feb. 10, 1920.

Application filed November 2, 1917. Serial No. 199,825.

*To all whom it may concern:*

Be it known that I, HARRY AFTON REYNOLDS, a citizen of the United States, residing at Chicago, in the county of Cook and State of Illinois, have invented a new and useful Improvement in Automobile Starting Devices, of which the following is a specification.

My invention relates to devices that enable the driver of an automobile to start his engine while he remains seated in the driving seat of the car, and the objects of the invention are to provide a device of this character which is simple in the construction and may be applied to the cars that are already built without trouble or expensive alterations, and the invention is set forth in the claims.

Reference will be had to the accompanying drawings in which Figure 1 is a side sectional elevation showing an automobile engine and the front of the car in such outline to indicate the application of my device. Fig. 2 is a vertical section on line 2—2 of Fig. 1.

Fig. 3 is a sectional detail on line 3—3 of Fig. 1. Fig. 4 is an edge elevation, and Fig. 5 a front elevation of a ratchet device used in my construction. Fig. 6 is a plan detail showing connection to the carbureter.

In the drawing, 1 indicates the seat of an automobile and is here taken as the Ford type of a car. 2 is the floor or where the driver's feet normally rest. 3 indicates the radiator of the car, and 4 indicates the engine. 5 indicates what is termed the crankcase of the engine.

6 indicates the stem of the engine shaft which sticks out in front where the crank is normally applied and the engine is started by cranking as is the common practice with the Ford car.

With my device I crank the car directly from the seat 1 through the medium of a foot treadle 7 on the side of which there are the ratchet teeth 8 which engage a toothed wheel 9 mounted on a shaft 10 which is carried in suitable bearings 11, 12 and 13, through to the front end of the engine; and at this point there is fastened on the shaft 10 a sprocket 14 which drives a chain 15, which in turn drives a sprocket 16 on the shaft 17 which is the fan shaft of the engine. On the shaft 17 there is also mounted a sprocket 18 driving a sprocket chain 19 which in turn drives a sprocket wheel 20 running loosely on the engine shaft 6.

On the shaft 6 there is mounted a ratchet 21 which is engaged by pawls 22 which are carried on arms 23 by a hub 24. The arms 23 and hub 24 are connected across to the sprocket wheel 20 and are as it were a part of the same, and this is accomplished through the medium of the pivots 25 of the pawls 22, as these pivots extend through the arms 23 and are secured through the web of the sprocket 20.

In the operation of the device, when the driver desires to start the engine he presses the foot treadle 7 down with his foot, and this results in turning the engine shaft through the mechanism as just described, and thus starts the engine.

A spring 26 on the foot treadle stock 27 returns the foot treadle to the normal position, and in this movement the pawls 22 slip backward on the ratchet 21 as is well understood.

A flexible connection 27 is connected at 28 at the bottom of the foot treadle and extends over a pulley 29 and is connected to the priming lever 30 of the carbureter 31 so that the act of pushing the foot treadle to start the engine also primes the carbureter for the charge of gas required in such instances.

In the event that from any cause the engine will "back-fire" no harm can come, as in this case the foot treadle 7 will be thrown upward to its normal position as indicated in Fig. 3, wherein the teeth 8 of the rack are above the teeth of the wheel 9 and thus permitting the wheel 9 to revolve under the influence of the backward movement of the engine without injury to the apparatus.

What I claim is:

1. In a starting device for an automobile using an explosive engine, an engine having a crank shaft, a ratchet secured to the forward end of the said crank shaft, a sprocket loosely mounted on the crank shaft adjacent to the ratchet, pawls carried by the sprocket and adapted to engage and drive the ratchet, a fan shaft spindle having a double set of sprocket wheels connected together and mounted to revolve thereon, a sprocket chain connecting one of the sprockets on the fan shaft spindle with the sprocket on the engine shaft, a horizontal shaft mounted alongside of the engine and extending from the front of the engine backward to the region of the driver's seat, a sprocket mounted on the front end of the horizontal shaft and connected by a chain to one of the sprocket wheels on the fan shaft spindle, a spur pinion on the rear end of the said horizontal shaft, a vertically arranged foot treadle rack mounted to engage the pinion by vertical movement of the rack, a spring engaging the rack and adapted to hold it in an upward normal position; with a priming lever of the engine carbureter connected by a flexible connection to the foot treadle.

2. In an automobile starting device having an engine with a crank shaft and a carbureter with a priming valve as described, a vertically arranged foot treadle rack mounted to be moved vertically under the influence of the foot of the driver, a horizontal shaft mounted alongside of the engine and underneath the body floor and extending forward to the front of the engine, a pinion on said shaft adjacent to the said rack and adapted to be engaged thereby, a coil spring engaging said rack and adapted to hold it normally free from the pinion but in line to engage the pinion on the compression of the spring; with gearing connected to the front end of said horizontal shaft connecting it to the forward end of the crank shaft; with a connection extending from the foot treadle to the priming valve of the carbureter.

Signed at Chicago, in the county of Cook, and State of Illinois this 25th day of October, 1917.

HARRY AFTON REYNOLDS.

Witnesses:
CARL H. NORDELL,
LOUISE E. GATES.